United States Patent [19]

Adams et al.

[11] 3,994,852

[45] Nov. 30, 1976

[54] LOW FLUID LOSS CEMENTING COMPOSITIONS CONTAINING POLYVINYLPYRROLIDONE-POLYACRYLAMIDE TRIBLOCK POLYMERS AND THEIR USE

[75] Inventors: Sally Lee Adams, Pittsburgh; Lawrence James Guilbault; Fred David Martin, both of McMurray, all of Pa.

[73] Assignee: Calgon Corporation, Pittsburgh, Pa.

[22] Filed: July 17, 1975

[21] Appl. No.: 596,933

Related U.S. Application Data

[63] Continuation-in-part of Ser. No. 508,301, Sept. 23, 1974, abandoned.

[52] U.S. Cl. ............................. 260/29.6 S; 166/295; 260/42.13
[51] Int. Cl.² ......................................... C08K 3/22
[58] Field of Search ............. 260/875, 29.6 S, 42.13

[56] References Cited

UNITED STATES PATENTS

| | | | |
|---|---|---|---|
| 2,614,998 | 10/1952 | Lea | 260/29.6 S |
| 3,132,693 | 5/1954 | Weisend | 260/29.6 S |
| 3,417,054 | 12/1968 | Merijan | 260/66 |
| 3,468,832 | 9/1969 | Barabas | 260/29.6 S |
| 3,493,529 | 2/1970 | Krottinger | 260/29.6 S |
| 3,776,983 | 12/1974 | Iovine | 260/901 |
| 3,876,573 | 4/1975 | Engelhardt | 260/42.13 |

*Primary Examiner*—Paul R. Michl
*Attorney, Agent, or Firm*—Harry E. Westlake, Jr.; Raymond M. Speer

[57] ABSTRACT

Improved cementing compositions and their use in well cementing operations is disclosed, wherein polyvinylpyrrolidone-polyacrylamide triblock polymers are used as fluid loss additives for aqueous hydraulic cement slurries.

12 Claims, No Drawings

LOW FLUID LOSS CEMENTING COMPOSITIONS CONTAINING POLYVINYLPYRROLIDONE-POLYACRYLAMIDE TRIBLOCK POLYMERS AND THEIR USE

This application is a continuation-in-part application of Application Ser. No. 508,301, filed Sept. 23, 1974, and now abandoned.

BACKGROUND OF THE INVENTION:

1. Field of the Invention

The present invention relates to improved cementing compositions and their use in cementing operations, particularly for cementing wells penetrating subterranean formations.

In particular, the present invention relates to additives to cementing compositions employed in the cementing of oil and gas wells, for the purpose of reducing fluid loss from the cementing composition to the surrounding subterranean formation which the well has penetrated.

More particularly, the present invention relates to polyvinylpyrrolidone-polyacrylamide triblock polymers as fluid loss additives to aqueous hydraulic cement slurries and the use of such slurries in well cementing operations, especially under conditions of high temperature and with brine as well as fresh water.

2. The Prior Art

Polymer compositions have long been used as additives to cementing compositions for the purpose of reducing water loss. For example, U.S. Pat. No. 2,614,998 discloses the use of water-soluble alkali salts of partially hydrolyzed polyacrylamide and polyacrylic acid for reducing the filtration of water from cement slurries. Polyvinylpyrrolidone is known as a fluid loss additive. Thus, U.S. Pat. No. 3,359,225 describes the use of polyvinylpyrrolidone to prevent the separation of free water from a cement slurry to which it is added and U.S. Pat. No. 3,511,313 discloses a method for sealing void spaces in a geological formation with a liquid slurry of water-swellable poly-N-vinyl pyrrolidone in an organo solvent therefor. It is also known in the cementing art to employ copolymers of polyvinylpyrrolidone as fluid loss additives to cement. U.S. Pat. No. 3,140,269 discloses inhibiting the fluid loss in an hydraulic cement composition by adding thereto a polymer prepared by copolymerizing maleic anhydride and N-vinylpyrrolidone. And U.S. Pat. No. 3,421,584 discloses a method of inhibiting fluid flow in terranean formations by emplacing in the formation an autonomously gelable composition containing a polymer prepared by polymerizing acrylamide and vinylpyrrolidone. Finally, U.S. Pat. No. 3,415,319 discloses an aqueous acid fluid for use in acidizing and hydraulic fracturing of oil- or gas-bearing formations which contains a copolymer of acrylamide and vinylpyrrolidone added for the purpose of controlling undesirable loss of fluid to a formation being treated. It has been found, however, that the polyvinylpyrrolidonepolyacrylamide triblock polymers of the present invention exhibit fluid loss reducing properties notably superior to those possessed either by vinylpyrrolidone homopolymer or by a random copolymer of vinylpyrrolidone and acrylamide.

SUMMARY OF THE INVENTION:

In drilling and completion of wells, particularly gas and oil wells, a bore-hole is drilled through the overlying layers of the earth's crust to a geologic formation from which it is desired to recover a fluid mineral contained therein. A casing is then introduced into the wellbore and cemented in place. This secures the casing in position, preventing unwanted shifting of the casing when the fluid being produced from a formation moves through it under considerable pressure. The cement also serves the important function of sealing off porous formations adjacent to or penetrated by the wellbore. Typically, a cement slurry in pumped downwardly through tubing within the well casing and flows out of the open lower end of the casing at the well bottom. It is then forced upwardly around the casing in the annular space between the outer wall of the casing and the wall of the wellbore. Thus pumped into place, the cement slurry sets into a monolithic mass in situ. After setting, the cement prevents the flow of undesired fluids from one formation to another, especially into the formation producing gas or oil.

However, neat cement slurries, that is, those comprising hydraulic cement and water, are subject to high fluid loss in porous formations. The water of the slurry migrates into the formation and the cement solids of the slurry are filtered out onto the face of the formation. This loss of water from cement slurries is accelerated by the relatively high pressures required to inject cement slurries into the annular space between well casing and wellbore. This pressure often results in squeezing water from the slurry and forcing this water into the pores of the surrounding formation. This loss of water from cement slurries is also increased by the practice of mechanically scraping away the drilling mud from the wall of the wellbore prior to pumping of the cement slurry into position. This procedure exposes porous formations which absorb water from the slurry.

Numerous problems are created by the loss of any appreciable amount of water from a cement slurry during a well cementing operation. For example, the lost water may contaminate the producing formation. Where oil sands are encountered, the contaminating water may cause shaley impurities in the sand to swell, thus greatly reducing the permeability of the oil sand formation. The loss of water will result in reduced fluidity of the cement slurry. This in turn requires increased pumping pressures and jeopardizes the entire cementing operation. Proper emplacement of the cement slurry is rendered difficult, accurate prediction of pumping times and cement volumes is prevented, cementing operation costs are increased, and final results are unsatisfactory. The loss of water from the cement slurry results in thickening or premature setting of the cement, often making completion of the cementing operation either difficult or impossible. The loss of water tends to result in a set cement of non-uniform consistency and of reduced compressive strength. As is known in the cementing art, greater compressive strengths are obtained when reduced quantities of water are employed to make up the cement slurry. Thus, reduction of the loss of water from a cement slurry to surrounding formations will also result in a reduction of the initial amount of water required to make up the slurry. This will allow complete hydration of the cement with reduced amounts of water, resulting in set cements of greater compressive strength.

Additional problems are encountered in deeper wells, where ambient temperatures may exceed 150° F. Many additive compositions which effectively inhibit fluid loss from aqueous hydraulic cement slurries at lower temperatures are ineffective at such higher ambient temperatures. The polyvinylpyrrolidone-polyacrylamide triblock copolymers of the present invention, however, are equally effective at such higher ambient temperatures.

Problems are also often encountered where it is desired to use sea or other salt water, i.e., brine or water containing a significant portion of dissolved inorganic salts, especially the chlorides of sodium, potassium, calcium and magnesium, in preparing the aqueous hydraulic cement slurries to be used in the well cementing operation. This will most often be the case with offshore drilling platform operations. The polyvinylpyrrolidone-polyacrylamide triblock copolymers of the present invention have been found to provide excellent fluid loss inhibition properties when used with aqueous hydraulic cement slurries prepared from brine instead of fresh water.

The present invention, therefore, is concerned with improved hydraulic cement slurry compositions and their use in cementing operations wherein the slurry composition is characterized by low water loss to surrounding porous formations during pumping of the cement slurry into place and the subsequent setting of the cement, especially under conditions of high temperature and with the use of brine as well as fresh water.

As used herein, the term "fluid loss" is intended to refer primarily to water loss, but is also intended to include minor amounts of other fluids which are subject to loss.

In accordance with the present invention, minor amounts of a polyvinylpyrrolidone-polyacrylamide triblock copolymer are added to an aqueous hydraulic cement slurry to reduce the rate of fluid loss from the slurry to any fluid-absorbing medium with which the slurry may come into contact.

The structure of the polyvinylpyrrolidone-polyacrylamide triblock copolymer low fluid loss additives of the present invention may be represented as follows: (polyacrylamide polyvinylpyrrolidone polyacrylamide) For brevity, this structure may be abbreviated as (AM PVP AM), or simply as A-B-A. These polymeric compositions are water-soluble, and the A block represents from 10 to 100,000 mer units of acrylamide, while the B block represents from 10 to 5,000 mer units of N-vinyl-2-pyrrolidone. The ratio of proportions by mole percent of the A and B blocks are, for the polyvinylpyrrolidone block: from about 50 to about 2 mole percent, and for the polyacrylamide block (the two blocks together): from about 50 to about 98 mole percent. Preferably the polyacrylamide block will be from about 60 to about 85 mole percent of the total triblock composition.

The molecular weights of the respective polyvinylpyrrolidone and polyacrylamide blocks may be varied over a considerable range, as already indicated. Since preparation of the triblock copolymers begins with polymerization of the vinylpyrrolidone, the molecular weight of this block is first established. The molecular weight of the polyacrylamide blocks is then controlled through regulation of the subsequent polymerization of acrylamide monomer, joined to the polyvinylpyrrolidone block. The molecular weight of the polyvinylpyrrolidone block may be from about 10,000 to 1,000,000 or more. Preferably, however, it will be in the range of from about 100,000 to about 500,000. Good results have been obtained using a polyvinylpyrrolidone of molecular weight about 360,000, with the molecular weight of the polyacrylamide varying with the mole percentage ratio of proportions for the triblock, generally from a molecular weight of about 2,500,000 to a molecular weight of about 100,000.

While no particular method of preparation is required, the ceric ion method taught by U.S. Pat. No. 2,922,678 and J. Macromol. Sci.-Chem., A7(8), pp. 1581–1590 (1973) has been found to be a convenient method of preparing the triblock copolymer low fluid loss additives of the present invention. Such methods are also disclosed in copending United States Application Ser. No. 465,660, which is incorporated herein by reference.

The compositions and methods of the present invention may employ any type of hydraulic cement. Hydraulic cement is defined as any cement which will set or cure under the action of water, and is intended to include all mixtures of lime, silica and alumina, or of lime and magnesia, silica, and alumina and iron oxide. Hydraulic cements include hydraulic limes, grappier cements, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 1800° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 Screen, U.S. Sieve Series. Thus, preferred oil well cements have a specific surface of about 1480 square centimeters per gram and about 85% by weight passes through a No. 325 Screen.

The hydraulic cement may be employed alone in preparing the cementing composition of the present invention, merely being admixed with water and the low fluid loss additive, or it may have additionally incorporated therein any of a number of conventional cement additives. For example, the cement may include a minor portion, up to about 2.0% by weight of dry cement, of a retarder composition. Such an additive is preferred for oil well cements, since cementing operations are conducted under ambient well bottom temperatures which can exceed about 200° F. Examples of conventional retarder compositions include carboxymethylhydroxyethyl cellulose, borax, dehydrated borax, calcium lignosulfonate and ferrochrome lignosulfonate.

Weighting components comprising inert materials such as barite and ilmenite are often employed. Silica may be employed to retard high temperature strength retrogression.

Other known additives conventionally employed with cementing compositions may be employed with the cementing compositions of this invention, and in amounts sufficient to produce the intended modification of the cementing composition characteristics for which any additive was selected. More than one such additive may, of course, be employed at the same time.

The dry hydraulic cement component of the cementing composition of the present invention is admixed with water to form a pumpable, settable cement slurry. The cement sets to form a monolithic solid. The water which is employed to form this cement slurry may be any naturally occurring water suitable for preparing cement slurries. Particularly, brines of any concentration of calcium chloride or sodium chloride or their mixtures are suitable. Sea water may be employed and is thus convenient in offshore operations. It is a particular advantage of the low fluid loss triblock copolymer additives of the present invention that they are effective in reducing fluid loss from a cement slurry even where brines are employed to make up the slurry. This constitutes an important advantage over many low fluid loss cement additives known in the art.

The amount of water employed to make up the hydraulic cement slurry is not critical, and generally the amount of water necessary to give a settable cement composition having the required characteristics will be in an amount of from about 25% to about 60% by weight, based on the weight of dry hydraulic cement. As discussed previously, the amount of water employed should be only such as is sufficient to produce a pumpable slurry. Use of the low water loss additives of the present invention makes it unnecessary to add excess water in anticipation of substantial water losses. The reduced initial water content will thereby tend to result in set cements of increased compressive strength.

The triblock polymer fluid loss additives of the present invention are employed in an amount sufficient to produce a measurable reduction in the loss of fluid from a cement slurry to which it has been added. Preferably, the amount employed will effect at least a 25 percent reduction in fluid loss. More preferably, the amount employed will effect a 50 percent reduction in fluid loss; and most preferably the amount employed will be sufficient to effect a fluid loss reduction in excess of 75 percent. While increasingly greater amounts of fluid loss reduction may be produced by employing correspondingly greater amounts of the fluid loss additives of this invention, reductions in excess of about 90 percent are usually not justified economically. Moreover, amounts of fluid loss additive necessary to produce extremely high reductions of fluid loss will also produce attendant difficulties with respect to undesirable effects on the properties of the cement slurry and set cement. As a general rule, a fluid loss of about 100 ml. over 30 minutes (as measured by the method set out in Example 2 below) is considered desirable.

Generally, the amount of triblock copolymer fluid loss additive employed will be in the range of from 0.05 to about 5.0% by weight of dry hydraulic cement, and usually in an amount of from about 0.15 to about 2.0% by weight of dry hydraulic cement. In determining specific amounts, consideration must be given to such factors as the composition of the cement slurry to which the fluid loss additive is added, and the temperatures to be encountered by the cement slurry during the cementing operation.

The procedure for preparing the cementing compositions of the present invention does not require any particular sequence of steps. The triblock copolymer low fluid loss additives of the present invention are water-soluble and thus may be mixed with the hydraulic cement before the addition of water, may be added to the slurry at the time of mixing, or may be added to the water before preparation of the cement slurry. When other conventional additives are employed, they may be incorporated into the final cement slurry composition in any known suitable manner.

The invention will be better understood from the following examples which illustrate the preparation and fluid loss reducing activity of representative triblock copolymers of this invention.

EXAMPLE 1

Preparation of Poly(Vinylpyrrolidone-b-Acrylamide)

To a one liter, 4-neck reaction flask fitted with mechanical stirrer, condenser, nitrogen inlet and catalyst addition tube was added 13.33 g. of acrylamide, 6.95 g. of polyvinylpyrrolidone (mol. wt. 360,000), and 500 ml. of distilled water. The mixture was stirred for one hour with nitrogen purging. To the mixture was then added, dropwise over a 3 hour period, a solution of 0.103 g. ceric ammonium nitrate, 1.88 ml. of 1N $HNO_3$ and 10 ml. of water. The reaction mixture was observed to become very viscous. After 16 hours at room temperature, the resulting polymer gel was precipitated into methanol in a blender. The solid product was isolated, washed with methanol and dried in vacuo. The reaction product was obtained in 85% yield and was found to have an intrinsic viscosity in 1N $NaNO_3$ of 3.2 dl/g. The triblock copolymer composition was determined by infrared analysis and found to be 73 mole percent acrylamide, 27 mole percent vinylpyrrolidone.

EXAMPLE 2

Evaluation of Fluid Loss Reducing Properties

Four triblock copolymer samples having various proportions of polyacrylamide and polyvinylpyrrolidone were evaluated for fluid loss reducing activity. An industry standard fluid loss additive for well cements, composed of basically of hydroxyethyl cellulose and a dispersant, was used as a control. The evaluation procedure employed was that set out in API bulletin RP 10B, Nineteenth Edition, January 1974, Section 8, pages 43–44. A cement slurry was made up containing 600 g. Class H cement (API Class H cement has a fineness in the range of 1400–1600 sq. cm./g. and contains, in addition to free lime and alkali, the following compounds in the indicated proportions: tricalcium silicate - 52, dicalcium silicate - 25, tricalcium aluminate - 5, tetracalcium aluminoferrite - 12, and calcium sulfate - 3.3.), 210 g. silica flour, 6 g. retarder, and 3.6 g. fluid loss additive of the present invention (0.6% by weight of dry hydraulic cement) in 276 mls. of 18% NaCl solution. (The triblock copolymer additives are identified in the table below as "PVP/AM" and the number ratios following each indicate the total composition distribution of each component.) These ingredients were mixed in a Waring Blender for 15 seconds at low speed, and then for 35 seconds at high speed. The resultant slurries were then mixed in a Halliburton Consistometer for 20 minutes at 190° F. The slurry samples were placed in a Baroid high pressure filter press cell maintained at 190° F. In the filter press cell the slurry samples were forced against a No. 325 U.S. Standard Sieve Series screen with 1000 p.s.i. pressure supplied by compressed nitrogen. The fluid removed from the slurry was collected and measured. Constant pressure was maintained and the filtrate collected over a 30 minute period. Results were reported as volume of filtrate (in mls.) collected in a 30 minute period. The results obtained are illustrated in the following table:

TABLE I

| Sample | Conc. of Additive (% by wt. of dry cement) | Fluid Loss (ml./30 min. at 1000 p.s.i.) |
|---|---|---|
| Neat Cement | — | 1000[a] |
| Control[b] | 0.6 | 122.5 |
| PVP/AM (50/50) | 0.6 | 64.8 |
| PVP/AM (60/40) | 0.6 | 64.4 |
| PVP/AM (33/66) | 0.6 | 53.0 |
| PVP/AM (10/90) | 0.6 | 61.1 |

[a]For neat cement (hydraulic cement and water only), virtually all water present was removed in less than one minute, and the value indicated was obtained by extrapolation.
[b]A commercially employed fluid-loss additive was used as control.

EXAMPLE 3

Preparation of Poly(Vinylpyrrolidone-b-Acrylamide) with PVP/AM Molar Ratios of 1:2 and 1.5:1

The procedures of Example 1 above were repeated under the following conditions and amounts of reactants to yield the indicated molar ratios of polyvinylpyrrolidone to polyacrylamide in the final triblock copolymer:

| Conditions and Reactants | PVP/AM Molar Ratios | |
|---|---|---|
|  | 1:2 | 1.5:1 |
| $H_2O$ | 1 liter | 1 liter |
| Acrylamide | 35.5 g. (0.5 mol) | 35.5 g. (0.5 mol) |
| Polyvinylpyrrolidone | 27.8 g. (0.25 mol) | 83.3 g. (0.75 mol) |
| Ceric Ammonium Nitrate | 0.274 g. (0.5 × 10$^{-3}$ mol) | 0.274 g. (0.5 × 10$^{-3}$ mol) |
| 1 N $HNO_3$ | 5 ml. (0.5 × 10$^{-2}$ mol) | 5 ml. (0.5 × 10$^{-2}$ mol) |
| % Active Solids Concentration | 6.0% | 10.5% |

However, unlike the procedure in Example 1 where vacuum dried precipitated solids were prepared, the triblock copolymers prepared in accordance with this Example were gels and were employed directly in this form for evaluation as fluid-loss inhibitor additives. The reaction products were evaluated for fluid-loss reducing properties in accordance with the description in Example 4 below.

EXAMPLE 4

Evaluation of Fluid-Loss Reducing Properties

The evaluation procedures of Example 2 above were repeated for the triblock copolymers prepared in Example 3 above, except that no retarder was employed and 324 mls. of fresh water or 18% NaCl solution was employed instead of 276 mls. Also, 6.0 g. of fluid loss additive of the present invention, rather than 3.6 g., was employed, which is a 1.0% by weight, based on dry hydraulic cement, concentration of active fluid-loss additive. The evaluation was divided into a low temperature-fresh water test at 100° F. (37° C.) using 324 ml. of fresh water; and a high temperature-brine test at 190° F. (87° C.) using 324 ml. of an 18% NaCl solution. The results obtained are illustrated in the following table:

TABLE II

| Low Temperature - Fresh Water | | |
|---|---|---|
| PVP/AM Molar Ratio | Fluid Loss (ml/30 min) | Viscosity (Units of Consistency[a]) |
| Control (neat cement) | >1000 | — |
| 1:2 | 42 | 24 |
| 1:2 | 40 | 22 |
| 1.5:1 | 50 | 16 |
| 1.5:1 | 72 | 22 |
| High Temperature - Brine | | |
| PVP/AM Molar Ratio | Fluid Loss (ml/30 min) | Viscosity (Units of Consistency[a]) |
| Control (neat cement) | >1000 | — |
| 1:2 | 69 | 15 |
| 1:2 | 67 | 15 |

[a]Measured by Halliburton Consistometer.

EXAMPLE 5

The preparation procedures of Example 1 were repeated under the following conditions and amounts of reactants:

| Preparation No. | PVP (g.) | AM (g.) | Ceric Ammonium Nitrate (mg.) | 1 N Nitric Acid (ml) | Form of Final Product |
|---|---|---|---|---|---|
| 1 | 55.5 | 35.5 | 548 | 10 | gel |
| 2 | 27.8 | 35.5 | 274 | 5 | gel |
| 3 | 27.8 | 35.5 | 274 | 5 | gel |
| 4 | 27.8 | 35.5 | 274 | 5 | gel |
| 5 | 27.8 | 35.5 | 274 | 5 | solid |
| 6 | 27.8 | 35.5 | 274 | 5 | solid |
| 7 | 33.3 | 49.7 | 329 | 6 | gel |
| 8 | 5.6 | 67.4 | 55 | 1 | gel |

The final reaction products were gels which were either employed directly in this form for subsequent evaluation as fluid loss additives, or were additionally treated by precipitation in methanol followed by drying in vacuo to yield dry solids. These two product forms are designated as "gel" and "solid" in the table of data above. These reaction products were then evaluated for fluid loss reducing properties in accordance with the description in Example 6 below.

EXAMPLE 6

The evaluation procedures of Example 2 above were repeated for the triblock copolymers prepared in Example 5 above, which were employed at 1.0% by weight, based on dry hydraulic cement, concentration of active fluid-loss additive. The evaluation was conducted at 190° F. (87° C.), using 18% NaCl solution to prepare the aqueous slurry. The results obtained are illustrated in the following table:

TABLE III

| Preparation No. | Form of Additive | Mole % AM | Viscosity (Units of Consistency) | | Fluid-Loss (ml/30 minutes) |
|---|---|---|---|---|---|
| | | | Initial | Final | |
| 1 | gel | 50 | 18 | 9 | 387 |
| 2 | gel | 66 | 35 | 15 | 69 |

TABLE III-continued

| Preparation No. | Form of Additive | Mole % AM | Viscosity (Units of Consistency) Initial | Final | Fluid-Loss (ml/30 minutes) |
|---|---|---|---|---|---|
| 3 | gel | 66 | 32 | 15 | 67 |
| 4 | gel | 66 | 29 | 21 | 50 |
| 5 | solid | 66 | 27 | 12 | 68 |
| 6 | solid | 66 | 26 | 12 | 54 |
| 7 | gel | 70 | 21 | 11 | 63 |
| 8 | gel | 95 | overly viscous | | |

EXAMPLE 7

In order to investigate the fluid-loss inhibiting effectiveness of the triblock copolymers of the present invention as a function of the amounts in which the said copolymers are added to aqueous hydraulic cement slurries, two test samples were employed to prepare aqueous hydraulic cement slurries containing varying amounts of fluid-loss inhibitor additive. The slurries were then evaluated in accordance with the procedures of Example 2 above, at 190° F. (88° C.), using 18% NaCl solution to prepare the slurries. The results are illustrated in the following table of values.

TABLE IV

| | Amount of Additive (% by wt. based on dry cement) | Viscosity (Units of Consistency) Initial | Final | Fluid-loss (ml./30 min.) |
|---|---|---|---|---|
| A. | PVP/AM Triblock Having 80 Mole Percent Acrylamide | | | |
| | 0.25 | 12 | 13 | >1000 |
| | 0.5 | 17 | 9 | 376 |
| | 1.0 | 31 | 15 | 48 |
| | 1.5 | 58 | 25 | 32 |
| | 2.0 | overly viscous | | |
| B. | PVP/AM Triblock Having 70 Mole Percent Acrylamide | | | |
| | 0.25 | 10 | 11 | >1000 |
| | 0.5 | 13 | 8 | 569 |
| | 1.0 | 25 | 11 | 84 |
| | 1.5 | 32 | 14 | 44 |
| | 2.0 | overly viscous | | |

EXAMPLE 8

In order to investigate possible differences between the fluid-loss inhibiting effectiveness of the triblock copolymers of the present invention and any fluid-loss inhibiting properties possessed by either vinylpyrrolidone homopolymer or a random copolymer of vinylpyrrolidone and acrylamide having the same ratio of components, samples of the latter materials were evaluated along with the triblock copolymers evaluated as described in Examples 2 and 7 above. The results of these two comparative evaluations are illustrated in the following table of values:

TABLE V

| Sample | Conc. of Additive (% by wt. of dry cement) | Fluid-Loss (ml./30 min.) | Viscosity (Units of Consistency) Initial | Final |
|---|---|---|---|---|
| A. | | | | |
| Neat cement | — | >1000 | | |
| Control* | 0.6 | 122.5 | | |
| Polyvinylpyrrolidone (homopolymer of 360,000 mol. wt.) | 0.6 | 438 | | |
| Random copolymer of vinylpyrrolidone and acrylamide of 5/95 molar ratio | 0.6 | 321.3 | | |
| PVP/AM Triblock of 10/90 molar ratio | 0.6 | 61.1 | | |
| B. | | | | |
| Neat Cement | — | >1000 | — | — |
| Random copolymer of vinylpyrrolidone and acrylamide of 20/80 molar ratio | 1.0 | 131.5 | 34 | 20 |
| PVP/AM Triblock of 20/80 molar ratio | 1.0 | 48.0 | 31 | 15 |

*A commercially employed fluid-loss additive was used as control.

The polyvinylpyrrolidone-polyacrylamide triblock copolymers of the present invention may be employed in a number of useful forms. They are readily water-soluble, and in lower concentrations, below about 1.0 to about 5.0% by weight, form aqueous solutions. At higher concentrations, the triblock copolymers form aqueous gels. They are readily used in this gel form, however, in preparing aqueous hydraulic cement slurries. The triblock copolymers of the present invention may also be obtained and used as solids, preferably dry, by precipitating them from aqueous solution by addition of a non-solvent, such as methanol to the aqueous solution. The precipitated solid may then be dried in vacuo, or by other conventional techniques. The solid thus obtained is then redissolved in the water used to prepare an hydraulic cement slurry, or may be incorporated into the aqueous hydraulic cement slurry in some other conventional manner.

What we claim is:

1. A low fluid loss cement composition capable of forming a fluid slurry when mixed with water, said cement composition comprising dry hydraulic cement and from about 0.05 to about 5.0 percent by weight, based on dry hydraulic cement, of a water-soluble triblock copolymer of the formula A-B-A wherein the A block represents from 10 to 100,000 mer units of acrylamide and the B block represents from 10 to 5,000 mer units of N-vinyl-2-pyrrolidone.

2. The cement composition of claim 1 wherein the A block constitutes from about 50 to about 98 mole percent of the copolymer and the B block constitutes from about 50 to about 2 mole percent of the copolymer.

3. The cement composition of claim 1 wherein the molecular weight of the N-vinyl-2-pyrrolidone is about 360,000.

4. A hydraulic cement slurry composition comprising dry hydraulic cement; from about 0.05 to about 5.0 percent by weight, based on dry hydraulic cement, of a water-soluble triblock copolymer of the formula A-B-A wherein the A block represents from 10 to 100,000 mer units of acrylamide and the B block represents from 10 to 5,000 mer units of N-vinyl-2-pyrrolidone; and sufficient water to form a pumpable slurry.

5. The cement composition of claim 4 wherein the A block constitutes from about 50 to about 98 mole percent of the copolymer and the B block constitutes from about 50 to about 2 mole percent of the copolymer.

6. The cement composition of claim 4 wherein the molecular weight of the N-vinyl-2-pyrrolidone is about 360,000.

7. A method of producing a hydraulic cement aqueous slurry composition comprising admixing together hydraulic cement, from about 0.05 to about 5.0 percent by weight, based on dry hydraulic cement, of a water-soluble triblock copolymer of the formula A-B-A wherein the A block represents from 10 to 100,000 mer units of acrylamide and the B block represents from 10 to 5,000 mer unis of N-vinyl-2-pyrrolidone, and sufficient water to form a pumpable slurry.

8. The method of claim 7 wherein the A block constitutes from about 50 to about 98 mole percent of the copolymer and the B block constitutes from about 50 to about 2 mole percent of the copolymer.

9. The method of claim 7 wherein the molecular weight of the N-vinyl-2-pyrrolidone is about 360,000.

10. A method of cementing a zone in a well penetrating a subterranean formation comprising injecting down the well and positioning in the zone to be cemented a hydraulic cement aqueous slurry composition comprising dry hydraulic cement, from about 0.05 to about 5.0 percent by weight, based on dry hydraulic cement, of a water-soluble triblock copolymer of the formula A-B-A wherein the A block represents from 10 to 100,000 mer units of acrylamide and the B block represents from 10 to 5,000 mer units of N-vinyl-2-pyrrolidone, and sufficient water to form a pumpable slurry; and allowing the cement thus positioned to set to a monolithic mass; whereby loss of fluid from the cement slurry to the formation is reduced.

11. The method of claim 10 wherein the A block constitutes from about 50 to about 98 mole percent of the copolymer and the B block constitutes from about 50 to about 2 mole percent of the copolymer.

12. The method of claim 10 wherein the molecular weight of the N-vinyl-2-pyrrolidone is about 360,000.

* * * * *